US007606217B2

United States Patent
Bender et al.

(10) Patent No.: US 7,606,217 B2
(45) Date of Patent: Oct. 20, 2009

(54) SYSTEM AND METHOD FOR ROUTING TELEPHONE CALLS OVER A VOICE AND DATA NETWORK

(75) Inventors: Doug Bender, Scotts Valley, CA (US); Anthony Zalenski, Boca Raton, FL (US); John M. Cooney, San Carlos, CA (US)

(73) Assignee: i2 Telecom International, Inc., Roswell, GA (US)

( * ) Notice: Subject to any disclaimer, the term of this patent is extended or adjusted under 35 U.S.C. 154(b) by 1040 days.

(21) Appl. No.: 10/624,433

(22) Filed: Jul. 22, 2003

(65) Prior Publication Data

US 2005/0002506 A1 Jan. 6, 2005

Related U.S. Application Data

(60) Provisional application No. 60/484,385, filed on Jul. 2, 2003.

(51) Int. Cl.
*H04L 12/66* (2006.01)

(52) U.S. Cl. .................................................. 370/352

(58) Field of Classification Search ......... 370/351–356, 370/400, 401, 465–567; 379/93.02, 93.04, 379/142.05, 142.06, 91.01, 114.21
See application file for complete search history.

(56) References Cited

U.S. PATENT DOCUMENTS

| | | | |
|---|---|---|---|
| 5,402,481 A | 3/1995 | Waldman | |
| 5,809,128 A | 9/1998 | McMullin | |
| 5,987,103 A | 11/1999 | Martino | |
| 6,014,440 A | 1/2000 | Melkild et al. | |
| 6,091,732 A | 7/2000 | Alexander, Jr. et al. | |
| 6,104,757 A | 8/2000 | Rhee | |
| 6,118,768 A | 9/2000 | Bhatia et al. | |
| 6,125,113 A | 9/2000 | Farris et al. | |
| 6,141,345 A * | 10/2000 | Goeddel et al. | 370/352 |
| 6,185,288 B1 * | 2/2001 | Wong | 379/219 |
| 6,256,778 B1 | 7/2001 | Oliver | |
| 6,307,853 B1 * | 10/2001 | Storch et al. | 370/354 |
| 6,351,464 B1 * | 2/2002 | Galvin et al. | 370/356 |
| 6,351,730 B2 | 2/2002 | Chen | |
| 6,359,880 B1 | 3/2002 | Curry et al. | |
| 6,389,005 B1 * | 5/2002 | Cruickshank | 370/352 |
| 6,404,870 B1 * | 6/2002 | Kia et al. | 379/144.01 |
| 6,434,139 B1 * | 8/2002 | Liu et al. | 370/352 |
| 6,445,694 B1 | 9/2002 | Swartz | |

(Continued)

OTHER PUBLICATIONS

Rosenberg, J. et al. "STUN—Simple Traversal of User Datagram Protocol (UDP) Through Network Address Translators (NATS)," RFC 3489, Mar. 2003, pp. 1-47.

(Continued)

*Primary Examiner*—Pankaj Kumar
*Assistant Examiner*—Duc T Duong
(74) *Attorney, Agent, or Firm*—Toler Law Group

(57) ABSTRACT

A system and method for routing a mobile phone call over a voice and data network. A user places a call on a mobile phone to an end destination. The call is then routed to a telecommunications gateway, where the call is converted into a medium that is transferable over the voice and data network. The converted call is then sent over the voice and data network to another PSTN and finally to the end destination.

23 Claims, 7 Drawing Sheets

U.S. PATENT DOCUMENTS

| | | |
|---|---|---|
| 6,449,251 B1 | 9/2002 | Awadallah et al. |
| 6,496,477 B1 | 12/2002 | Perkins et al. |
| 6,542,497 B1 * | 4/2003 | Curry et al. ............... 370/352 |
| 6,597,686 B1 * | 7/2003 | Smyk .................... 370/352 |
| 6,603,774 B1 | 8/2003 | Knappe et al. |
| 6,618,761 B2 | 9/2003 | Munger et al. |
| 6,636,504 B1 * | 10/2003 | Albers et al. ............... 370/352 |
| 6,658,496 B1 | 12/2003 | Minakata et al. |
| 6,700,956 B2 * | 3/2004 | Chang et al. ............. 379/93.09 |
| 6,760,324 B1 | 7/2004 | Scott et al. |
| 6,763,226 B1 | 7/2004 | McZeal, Jr. |
| 6,771,594 B1 | 8/2004 | Upadrasta |
| 6,788,769 B1 | 9/2004 | Waites |
| 6,795,540 B1 | 9/2004 | Mow |
| 6,822,957 B1 | 11/2004 | Schuster et al. |
| 6,826,174 B1 | 11/2004 | Erekson et al. |
| 6,856,612 B1 | 2/2005 | Bjelland et al. |
| 6,895,000 B2 | 5/2005 | Lai et al. |
| 6,907,031 B1 * | 6/2005 | Ehlinger et al. ............. 370/352 |
| 6,934,258 B1 * | 8/2005 | Smith et al. ............... 370/238 |
| 6,947,417 B2 | 9/2005 | Laursen et al. |
| 6,954,454 B1 * | 10/2005 | Schuster et al. ............. 370/352 |
| 7,012,888 B2 | 3/2006 | Schoeneberger et al. |
| 7,016,481 B2 | 3/2006 | McElvaney |
| 7,042,841 B2 | 5/2006 | Abdelilah et al. |
| 7,046,683 B1 | 5/2006 | Zhao |
| 7,092,380 B1 * | 8/2006 | Chen et al. ................. 370/352 |
| 7,113,500 B1 * | 9/2006 | Bollinger et al. ............ 370/352 |
| 7,145,900 B2 * | 12/2006 | Nix et al. ................... 370/352 |
| 7,212,622 B2 * | 5/2007 | Delaney et al. ........ 379/221.02 |
| 7,213,766 B2 | 5/2007 | Ryan et al. |
| 7,227,938 B2 | 6/2007 | Rodman et al. |
| 7,280,530 B2 * | 10/2007 | Chang et al. ............... 370/352 |
| 7,283,542 B2 | 10/2007 | Mitchell |
| 7,302,053 B2 | 11/2007 | Chang et al. |
| 7,336,654 B2 | 2/2008 | Barkley et al. |
| 2001/0038033 A1 | 11/2001 | Habib |
| 2002/0052965 A1 | 5/2002 | Dowling |
| 2002/0097843 A1 | 7/2002 | Krol et al. |
| 2002/0131604 A1 | 9/2002 | Amine |
| 2002/0147912 A1 | 10/2002 | Shmueli et al. |
| 2002/0184376 A1 | 12/2002 | Sternagle |
| 2002/0191621 A1 | 12/2002 | Jha |
| 2002/0191768 A1 | 12/2002 | Stoughton |
| 2003/0002479 A1 | 1/2003 | Vortman et al. |
| 2003/0023669 A1 | 1/2003 | DeLima et al. |
| 2003/0093606 A1 | 5/2003 | Mambakkam et al. |
| 2003/0110257 A1 | 6/2003 | Hyun et al. |
| 2003/0112820 A1 | 6/2003 | Beach |
| 2003/0123388 A1 | 7/2003 | Bradd |
| 2003/0161453 A1 | 8/2003 | Veschi |
| 2003/0204619 A1 | 10/2003 | Bays |
| 2003/0214939 A1 | 11/2003 | Eldumiati et al. |
| 2003/0219006 A1 | 11/2003 | Har |
| 2004/0019539 A1 | 1/2004 | Raman et al. |
| 2004/0032860 A1 | 2/2004 | Mundra et al. |
| 2004/0032862 A1 | 2/2004 | Schoeneberger et al. |
| 2004/0047451 A1 | 3/2004 | Barker et al. |
| 2004/0086093 A1 | 5/2004 | Schranz |
| 2004/0114581 A1 | 6/2004 | Hans et al. |
| 2004/0133668 A1 | 7/2004 | Nicholas, III |
| 2004/0141508 A1 | 7/2004 | Schoeneberger et al. |
| 2004/0141758 A1 | 7/2004 | El-Reedy |
| 2004/0165578 A1 | 8/2004 | Burritt et al. |
| 2004/0205023 A1 | 10/2004 | Hafer et al. |
| 2004/0205777 A1 | 10/2004 | Zalenski et al. |
| 2004/0218583 A1 | 11/2004 | Adan et al. |
| 2004/0223458 A1 | 11/2004 | Gentle |
| 2004/0248590 A1 | 12/2004 | Chan et al. |
| 2004/0258003 A1 | 12/2004 | Kokot et al. |
| 2005/0074031 A1 | 4/2005 | Sunstrum |
| 2005/0074122 A1 | 4/2005 | Fascenda |
| 2005/0089052 A1 | 4/2005 | Chen et al. |
| 2005/0091392 A1 | 4/2005 | Gesswein et al. |
| 2005/0094621 A1 | 5/2005 | Acharya et al. |
| 2005/0138183 A1 | 6/2005 | O'Rourke et al. |
| 2005/0180464 A1 | 8/2005 | McConnell et al. |
| 2005/0195799 A1 | 9/2005 | Burne et al. |
| 2005/0201414 A1 | 9/2005 | Awais |
| 2005/0220083 A1 | 10/2005 | Takeuchi |
| 2005/0243733 A1 | 11/2005 | Crawford et al. |
| 2006/0008059 A1 | 1/2006 | Ying et al. |
| 2006/0029062 A1 | 2/2006 | Rao et al. |
| 2006/0029063 A1 | 2/2006 | Rao et al. |
| 2006/0031393 A1 | 2/2006 | Cooney et al. |
| 2006/0034296 A1 | 2/2006 | Talucci |
| 2006/0037071 A1 | 2/2006 | Rao et al. |
| 2006/0039356 A1 | 2/2006 | Rao et al. |
| 2006/0208066 A1 | 9/2006 | Finn et al. |
| 2006/0276230 A1 | 12/2006 | McConnell |
| 2007/0248081 A1 | 10/2007 | Barkley et al. |
| 2008/0025291 A1 | 1/2008 | Barkley et al. |

OTHER PUBLICATIONS

Schulzrinne, H. "Dynamic Host Configuration Protocol (DHCP-for-IPv4) Option for Session Initiation Protocol (SIP) Servers," RFC 3361, Aug. 2002, pp. 1-7.

Camarillo, G. et al. "Integration of Resource Management and Session Initiation Protocol (SIP)," RFC 3312, Oct. 2002, pp. 1-30.

"EcoCarrier-carrier, long distance, call, VoIP, ITSP, service", www.ecocarrier.com, printed Jun. 13, 2005, pp. 1-3.

"EcoPhone + VolPIPhone Q-FONE-USB", which appears to come from www.qiiq.com, Jun. 10, 2005, printed Jun. 10, 2005, pp. 1-3.

"Brief Introduction to QiiQ Communications Inc. and Eccocarrier Inc.", www.qiiq.com, printed Jun. 10, 2005 and Jul. 17, 2005, pp. 1-7.

Trembley, J. "VoIP makes real-time billing a necessity", Billing Plus, vol. 6, No. 17, Oct. 4, 2004, p. 13.

"Pre-paid Call Credits—Adding Extra Call Credits", www.2hands.com.au, (added to catalog Jun. 30, 2004), printed Jun. 1, 2005, pp. 1-2.

"SIPphoneCasting. Inspired by: Skype Podcast Recorder=SkypeCasters", linuxathome.com, Dec. 29, 2004, pp. 1-4.

"CommGenie VoIP Suite", www.nexge.com, printed Jun. 1, 2005, pp. 1-3.

"Web Based, VoIP Billing, VoIP Routing, and VoIP Management Software", www.webvoip.com, printed Jun. 1, 2005, pp. 1-2.

Tittel, E. "Cool Tools: USB Desktop Peripherals and Devices", www.certmag.com, Jun. 2005, pp. 1-7.

Bennet, B. "Memory in a Flash", www.theage.com.au, Jan. 31, 2004, pp. 1-3.

Barkley et al., U.S. Appl. No. 10/969,516, entitled "Portable Voip Service Access Module," filed on Oct. 20, 2004, 18 pages.

"Pocki Phone VoIP Softphone + USB Flash Disk Drive (128M)", www.welltech.com/newsletter/vol_5/20041005.htm, Oct. 5, 2004, 2 pages.

Rosenberg, J. et al., "SIP: Session Initiation Protocol," RFC 3261, Jun. 2002, pp. 1-18.

Douglas F. Bender, U.S. Appl. No. 12/098,947, entitled "Systems and Methods of Making a Call," filed on Apr. 7, 2008, 32 pages.

* cited by examiner

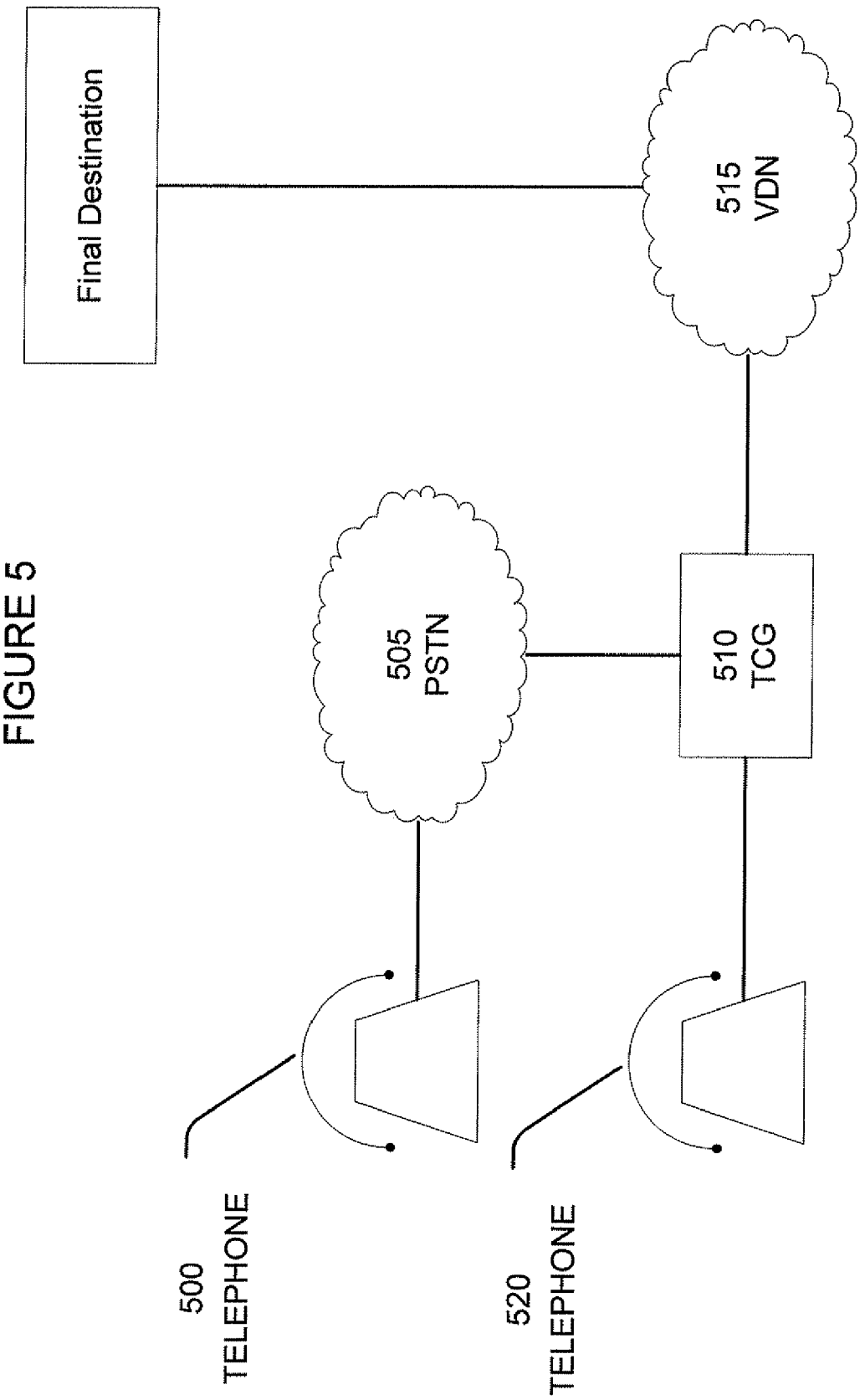

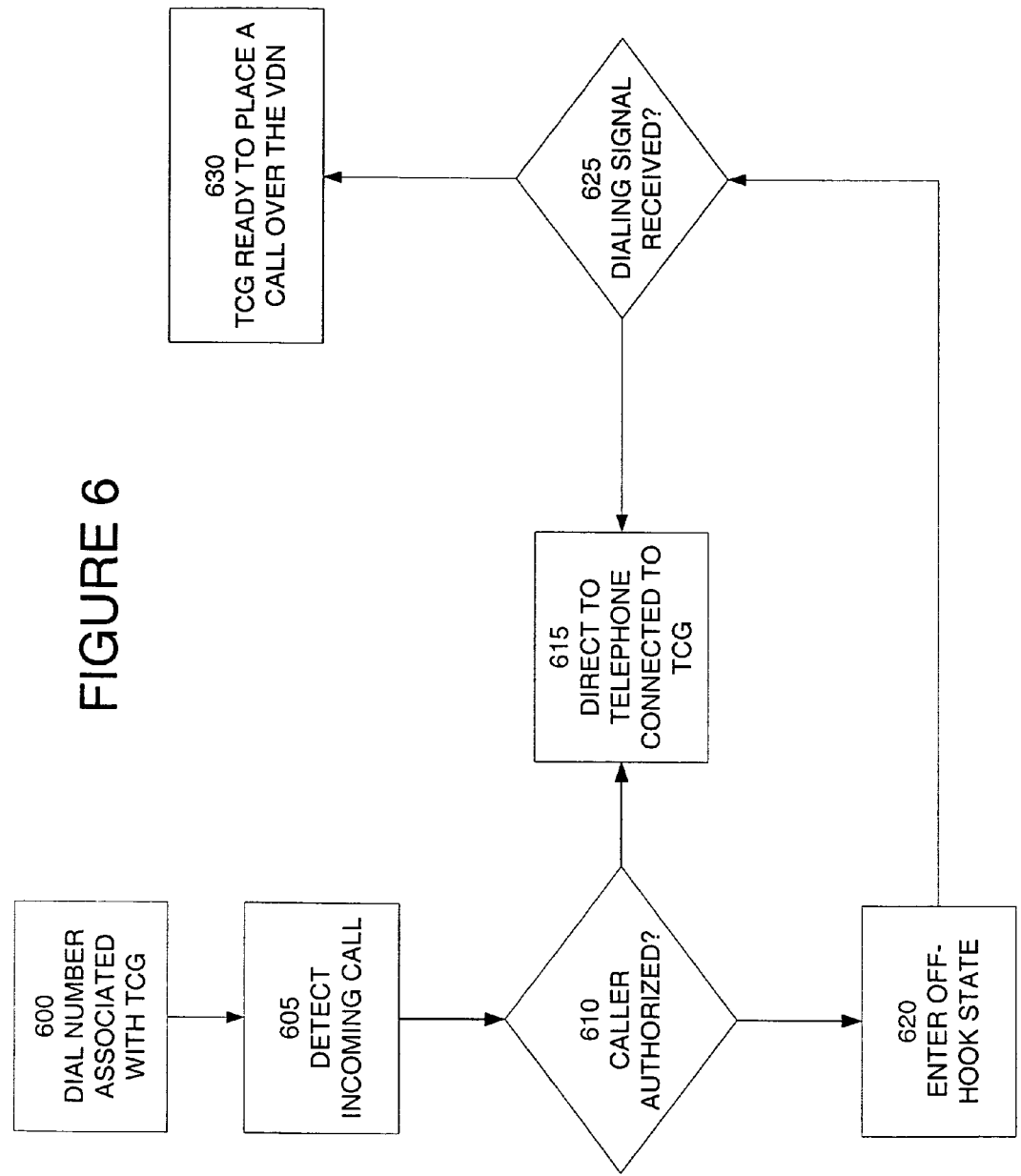

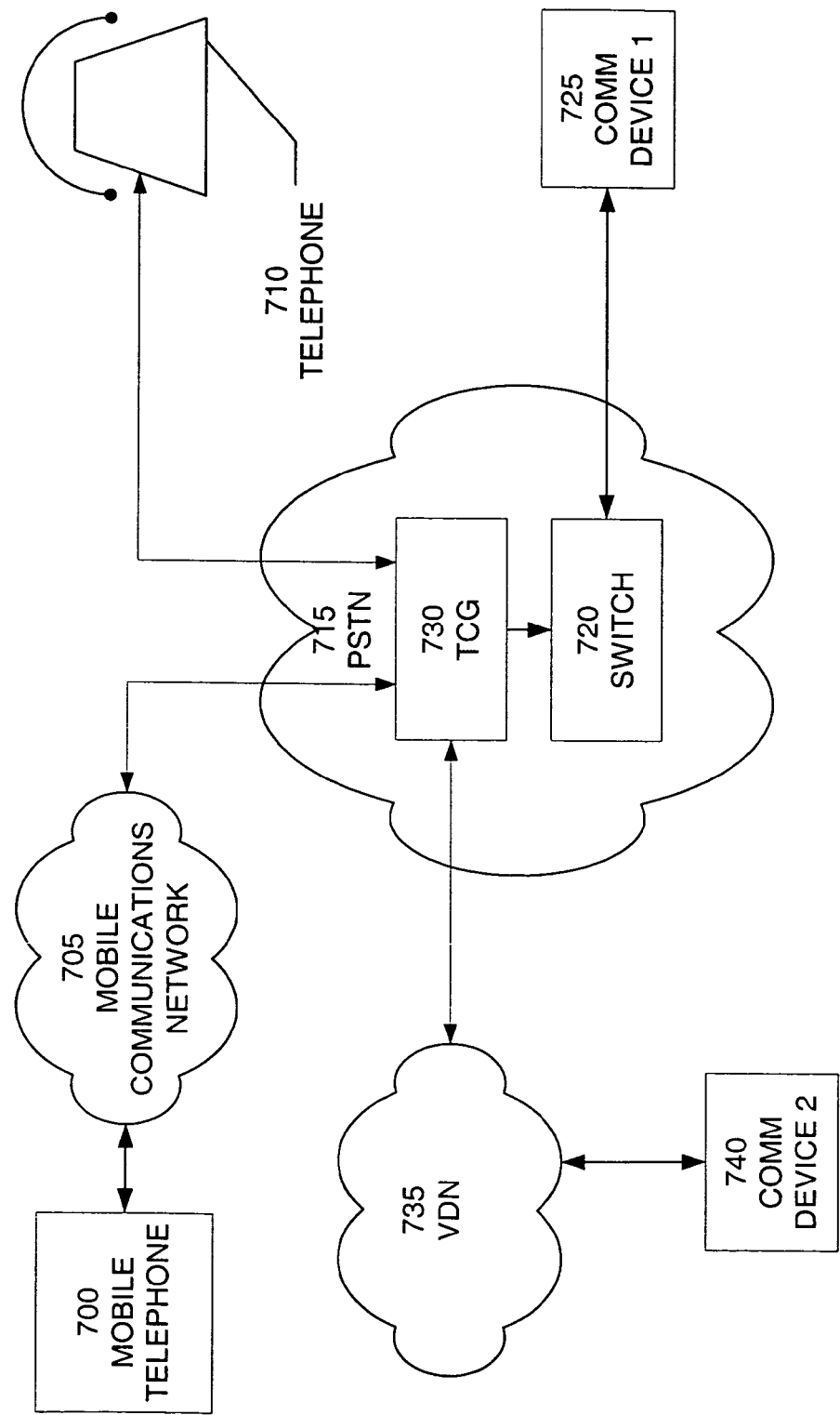

SYSTEM AND METHOD FOR ROUTING TELEPHONE CALLS OVER A VOICE AND DATA NETWORK

CROSS REFERENCE TO RELATED APPLICATIONS

This application claims priority under 35 U.S.C. § 119(e) from provisional application No. is 60/484,385 filed Jul. 2, 2003, and application Ser. No. 10/354,527 filed Jan. 30, 2003, both of which applications are incorporated by reference herein, in their entirety, for all purposes.

FIELD OF THE INVENTION

The present invention relates generally to routing of telephone calls. More particularly, the present invention relates to the routing of telephone calls initiated on a wired or wireless telecommunication network to a voice and data network (VDN).

BACKGROUND OF THE INVENTION

It is known in the art to place telephone calls around the world using conventional public switched telephone network systems. FIG. 1 illustrates a simplified diagram of how a call, such as a long distance call is handled. A caller first uses a telephone 100 and makes a call that is routed though a public switched telephone network (PSTN) 110 to another phone anywhere in the world 115. Similarly, as shown in FIG. 2, a mobile phone user uses a mobile phone 200 to make a call that is first routed to a mobile phone network 205 and then to a PSTN 210 where it can then be routed to a telecommunications device 215 located any place around the world, such as a telephone in located in a distant country 220.

Operators of PSTNs charge callers for the routing of phone calls. Though the exact amounts of the charges vary depending on market circumstances, it is almost universally true that the further away the call is going (i.e. long distance calls), the greater the cost to the user. This is particularly true when calls cross political boundaries, such as borders between countries, as well as physical boundaries, such as oceans.

Vendors currently offer products that provide permit telecommunications to be carried via a VDN such as the Internet. For example, Vonage is a company that uses the Cisco ATA. Features that allow mobile telephone usage over the Internet cannot offer this calling activity with this unit. The Cisco ATA unit is broadband only and does not provide a means to attach to the phone jack in the wall. Without attachment to the wall the Vonage-Cisco unit cannot detect incoming PSTN calls. Without the ability to detect incoming PSTN calls the Vonage-Cisco unit cannot then bridge PSTN callers into the Vonage voice over Internet Protocol (VoIP) network.

Packet 8 sells an Internet access device (LAD) (DTA310) that is broadband only. The DTA310 provides a single RJ-11 connection for an analog phone. The DTA310 does not provide a means to attach the unit to the phone jack in the wall. Without attachment to the wall the Packet 8 unit cannot detect incoming PSTN calls; without the ability to detect incoming PSTN calls the Packet 8 unit cannot then bridge PSTN callers into the Packet 8 VoIP network.

Net2Phone sells a line of IAD units supporting both broadband and narrowband dialup. One unit provides a 2-port gateway includes means to connect directly to a phone jack in the wall. It is unknown if the hardware architecture of the Net2Phone unit supports the ability to bridge a mobile caller into their VoIP network. However, firmware does not appear to be available for the current IAD units to make VoIP calling from non-VoIP telephones a reality.

What would be useful are a system and method for routing calls originating from the PSTN and mobile telephone networks to VDN thereby permitting telephone users to take advantage of the Internet as a telecommunication network for the placing of long distance telephone calls.

SUMMARY OF THE INVENTION

An embodiment of the present invention utilizes a telecommunications gateway (TCG) configured to receive communications from a remote location via a communications device (either via a PSTN or a wireless network operated by a mobile service provider). The TCG initiates a call from the gateway to a remote communication device over a VDN. In another embodiment of the present invention, the VDN is the Internet and the remote communication device is a telephone (either wired or mobile), but the present invention is not so limited. The TCG functions as a bridge between the incoming calling device and the remote communication device. In another embodiment of the present invention, the functions of the TCG are performed by equipment operated by the operator of a PSTN.

In this application the term "mobile" is used to denote cellular telephone users, mobile telephone users and ultimately other users of mobile devices that might require access to long distance services in order to send or receive data. Thus while this application discusses the routing of mobile telephone calls, those skilled in the art will understand that this technology and method apply equally to other mobile devices as well.

It is therefore an aspect of the present invention to permit users to make long distance calls using the Internet as the communication network of choice.

It is a further aspect of the present invention to permit mobile telephone users to take advantage of the Internet as a telecommunication network for the placing of long distance telephone calls.

It is yet another aspect of the present invention to support "Anywhere-Anytime" VoIP access.

It is another aspect of the present invention to provide access to VoIP calling without regard to the technology used by the calling party or the receiving party.

It is yet another aspect of the present invention to support all mobile providers worldwide, regardless of their format (e.g., CDMA, TDMA, GSM) and protocols used.

These and other aspects of the present invention will become apparent from a review of the general and detailed descriptions that follow.

An embodiment of the present invention utilizes a telecommunications gateway (TCG) configured to receive communications from a remote location via a communications device (either from via a PSTN or a wireless network operated by a mobile service provider). The TCG initiates a call from the gateway to a remote communication device over a VDN. By way of illustration and not as a limitation, a call is made from a first communication device to second communication device to which a TCG is connected. The call is then intercepted at the TCG where the call is converted via an appropriate protocol into a bit stream according to an appropriate protocol that is transferable over a VDN. In an embodiment of the present invention, the VDN is the Internet. The bit stream comprises proper identifiers and routing indications. The converted call is then sent over the voice and data network to another PSTN or TCG and finally to the end destination.

In another embodiment of the present invention, the functions of the TCG are performed by equipment operated by the operator of a PSTN. In this embodiment, the TCG is under the control of the operation of the PSTN and the caller directs the PSTN to route the call over a VDN.

BRIEF DESCRIPTION OF THE DRAWINGS

FIG. 5 illustrates another embodiment of a mobile phone call routed through the Internet according to the present invention.

FIG. 6 illustrates the logical flow of placing a telephone call from a mobile telephone using the present invention.

FIG. 7 illustrates a block diagram of a PSTN having means for sending a call over a VDN at the direction of a caller in accordance with an embodiment of the present invention.

DETAILED DESCRIPTION OF THE INVENTION

An embodiment of the present invention utilizes a telecommunications gateway (TCG) configured to receive communications from a remote location via a telephone call (either from the PSTN or a mobile service provider). The TCG initiates a call from the gateway to a remote communication device over a VDN. In another embodiment of the present invention, the VDN is the Internet and the remote communication device is a telephone (either wired or mobile), but the present invention is not so limited. The TCG functions as a bridge between the incoming calling device and the remote communication device. By way of illustration and not as a limitation, using the present invention the caller first places a call on a telephone (wired or mobile) to an end destination where their TCG is connected. The call is then intercepted at the TCG where the call is converted via an appropriate protocol into a bit stream according to an appropriate protocol that is transferable over a VDN. In an embodiment of the present invention, the VDN is the Internet. The bit stream comprises proper identifiers and routing indications. In another embodiment of the present invention, the bit stream comprises discrete packets. The converted call is then sent over the voice and data network to another PSTN or TCG and finally to the end destination.

In this application the term "mobile" is used to denote cellular telephone users, mobile telephone users and ultimately other users of mobile devices that might require access to long distance services in order to send or receive data. Thus while this application discusses the routing of mobile telephone calls, those skilled in the art will understand that this technology and method apply equally to other mobile devices as well. In addition, while the exemplary embodiments are described in the context of telephone devices (both wired and wireless), any communication device that is capable of providing the signaling and/or authentication information used by the various embodiments of the present invention may be employed without departing from the scope of the present invention.

Figure 1:
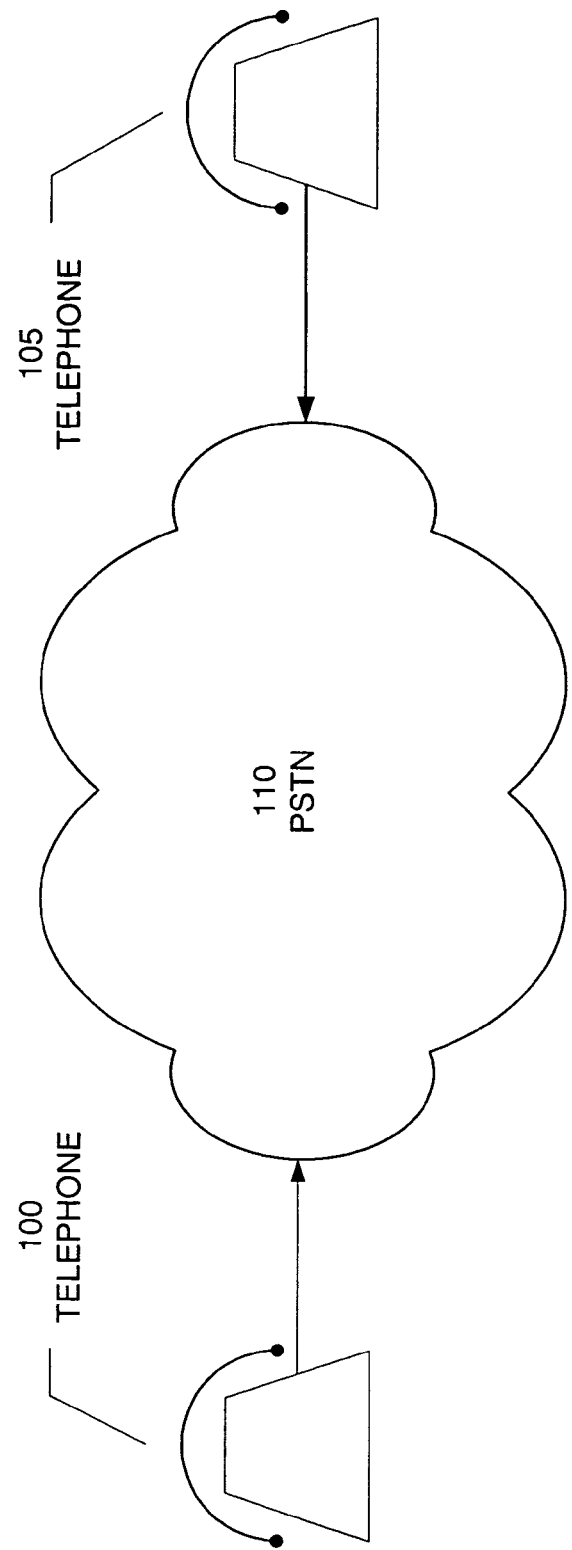
FIG. 1 illustrates a diagram of a standard phone call according to the prior art.
Figure 2:
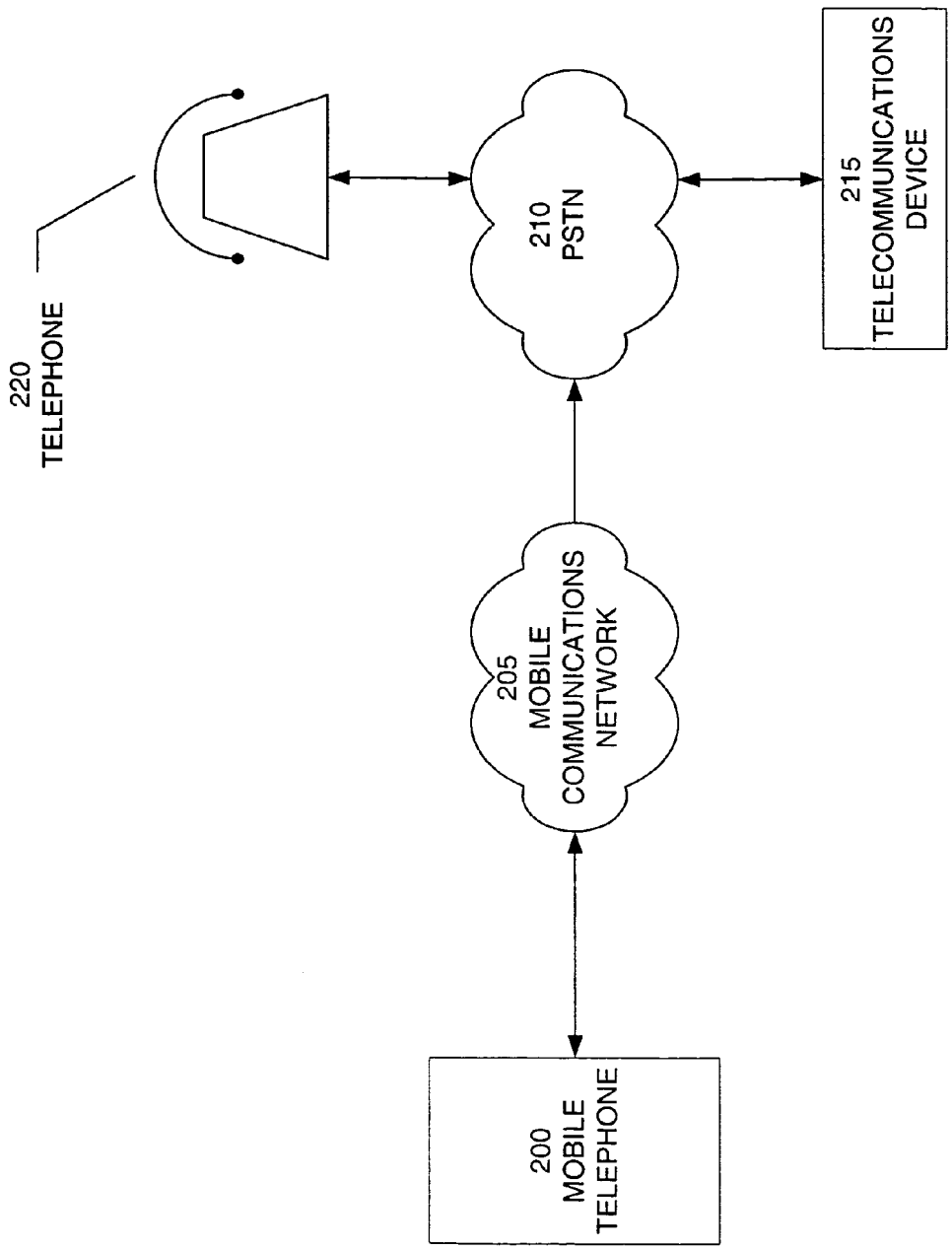
FIG. 2 illustrates a diagram of a cell phone call according to the prior art.
Figure 3:
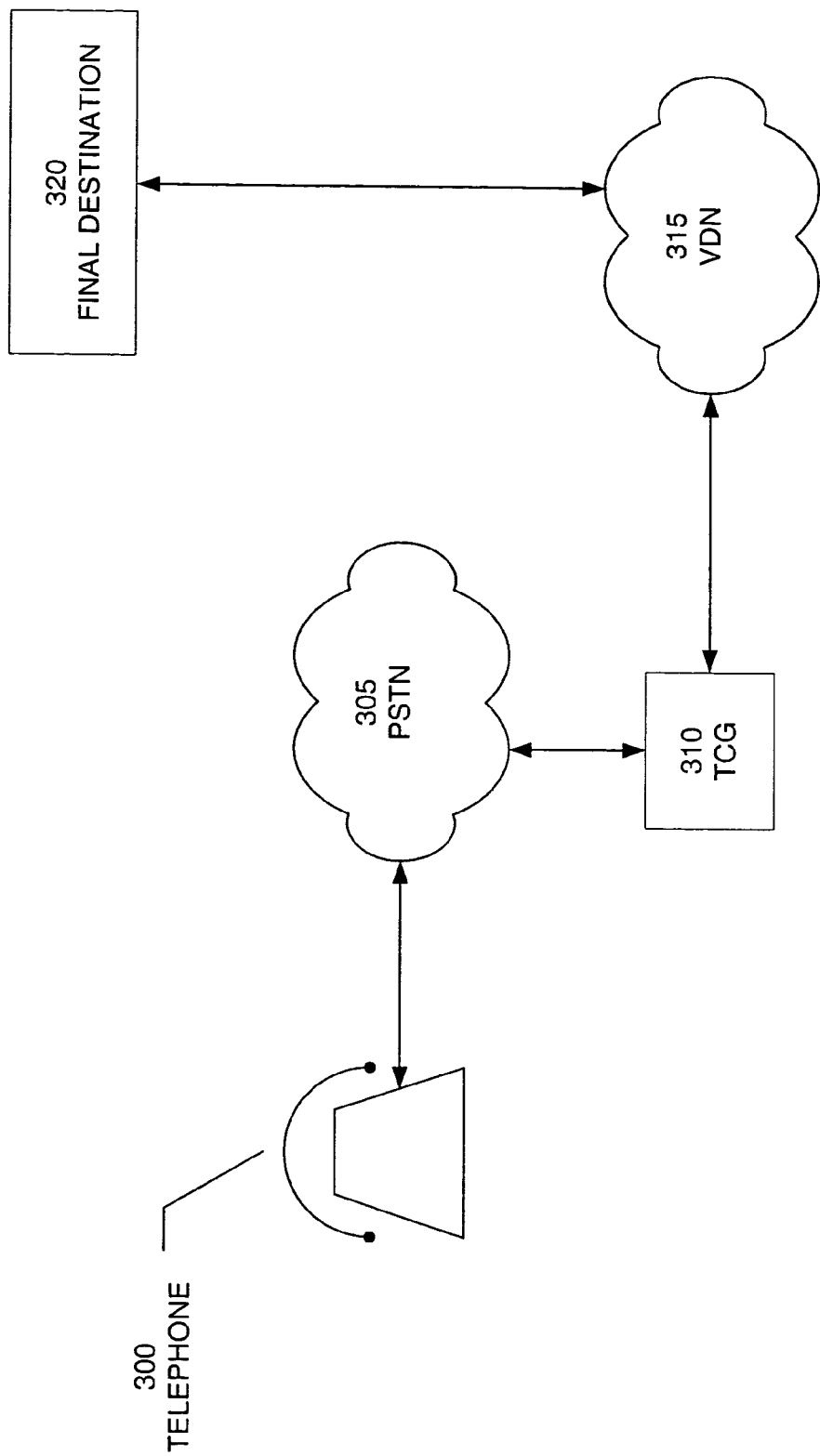
FIG. 3 illustrates a diagram of a POTS phone call routed through the Internet according to an embodiment of the present invention.

FIG. 3 illustrates a diagram of a phone call placed over the PSTN and routed through the Internet. By way of illustration and not as a limitation, a call is initiated on a telephone 300 to a number associated with a TCG 310. This call is then routed normally to the TCG 310 through the PSTN 305. The call is authenticated as being from an authorized user. If appropriate signaling is received from the caller, the TCG 310 converts the telephone signal into a bit stream according to an appropriate protocol that is transferable over a VDN 315. In an embodiment of the present invention, the VDN is the Internet. The bit stream comprises proper identifiers and routing indications. In another embodiment of the present invention, the bit stream comprises discrete packets. The converted call is then sent to a final destination 320 via the VDN 315. The path to the final destination may be via another PSTN 305 or another TCG 310.

Figure 4:
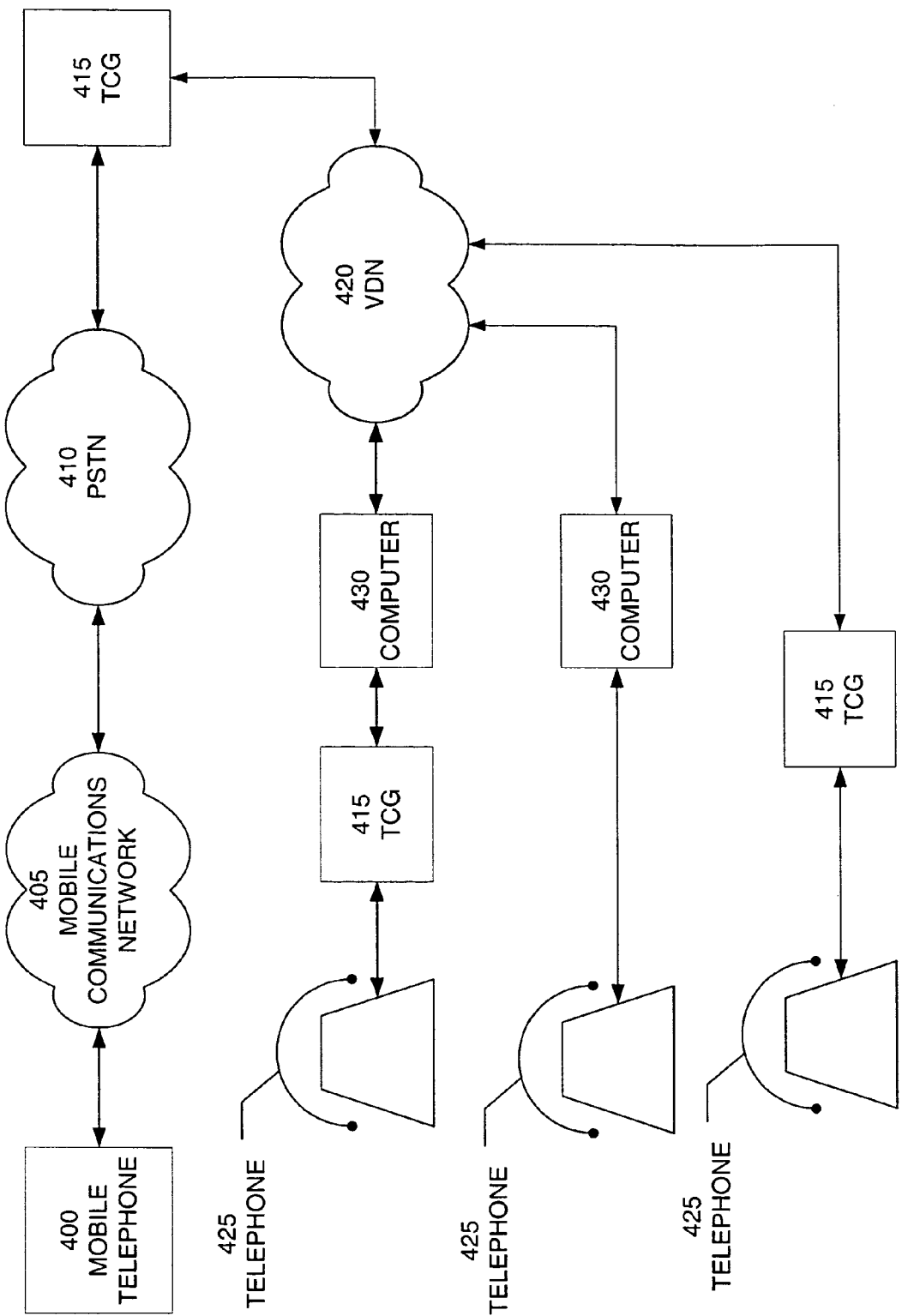
FIG. 4 illustrates a diagram of a mobile phone call routed through the Internet according to one embodiment of present invention.

FIG. 4 illustrates a diagram of a mobile phone call routed through the Internet according to one embodiment present invention. A user places a call on a mobile phone 400 that is linked to a mobile phone network 405. The call then is routed though the PSTN 410 to a telecommunications gateway (TCG) 415 that authenticates the caller and, if authenticated, converts the phone signal into a bit stream according to an appropriate protocol that is transferable over a VDN. In an embodiment of the present invention, the VDN is the Internet. The bit stream comprises proper identifiers and routing indications. In another embodiment of the present invention, the bit stream comprises discrete packets.

The converted call is then directed, over a VDN 420, to another telecommunications device. As illustrated in FIG. 4, the telecommunication device may be a telephone 425 connected to another TCG 415, to a telephone 425 connected to a computer 430, or a telephone connected to a TCG 415 that is connected to the VDN 420 via to a computer 430. However, the present invention is not so limited. The communication device to which the call is directed may be any device capable of receiving and processing the data sent by the caller.

In one embodiment of the present invention, the call made by the mobile phone is a phone number associated with the TCG. In another embodiment of the present invention, the phone number is associated with a plurality of TCGs on and TCG network, and the mobile phone call is routed to a particular TCG on the network. In these embodiments, once the mobile phone has connected with the TCG, the mobile phone user is prompted for a dialing sequence, which corresponds with another TCG or to a PSTN telephone call.

As noted above, in an embodiment of the present invention, the TCG performs an authentication step wherein a user or an account associated with the calling telecommunication device is identified. Based upon this identification, the call is either allowed to proceed or not. In an embodiment of the present invention, the authentication of the caller is achieved using the caller ID data associated with the incoming call (either from a POTs or a mobile telephone or device). However, this is not meant as a limitation. Other authentication methods, such as electronic serial number (ESN), may be used to authenticate the user to the TCG. Similarly any other authentication system that uniquely identifies a user or group of users is within the scope of the present invention. For example, the caller may be prompted for more information such as a password or access code.

Though the Internet is used in the above example, the present invention contemplates the use of any voice and data network capable of transferring information as required by the present invention.

FIG. 5 illustrates another embodiment of the present invention where the call routing system discussed in reference to FIG. 3 is adapted to permit the call to be routed to a telephone 520 physically connected to TCG 510 rather than directed to VDN 515. This transfer to a telephone 520 physically connected to the TCG 510 rather than the VDN 515 may be initiated by a selection on telephone 500, or a lack of a selection, either when the call is first made or once connection with the TCG 510 is established. The selection may take a variety of forms such as determining the presence of a long distance designator (for example, the # sign) in the telephone number associate with the TCG 310, or not and waiting for an internal timer to note the absence of a "#" sign. However, such dialing notifications may include but not be limited to depressing of a predetermined key, lack of selection of a predetermined key, or the calling of a unique telephone number. Although not illustrated, the call routing system discussed in reference to FIG. 4 may be similarly adapted to direct the call from the wireless telephone 400 to a telephone 425 physically connected to TCG 415.

Referring now to FIG. 6, the method of the present invention for placing calls over the Internet (for example) from a mobile telephone is illustrated. A mobile phone user first dials the number associated with a PSTN line connected to the TCG 600. The TCG then detects the incoming call 605. A determination is made whether the caller is authorized to access the VDN through the TCG 610. If the caller does not present acceptable authorization credentials, 615 the call is directed to a telephone connected to the PSTN line.

If caller's authorization credentials are accepted, the TCG places the phone in the "off-hook" condition 620 and determines if a dialing signal is received 625. If no dialing signal is received, the TCG passes the call through the telephone connected to the PSTN line 615.

If a dialing signal is received, the TCG is ready for entry of a number or address to place a call over the VDN 630 according to the convention established by the TCG manufacturer and/or the VoIP service provider providing the VoIP service.

In an embodiment of the present invention, the authorization credentials comprise a caller ID. In another embodiment of the present invention, the caller is prompted to provide an authorization credential. In yet another embodiment of the present invention, in the event that the authorization credential is accepted, the TCG emits a uniquely identifiable tone to alert the caller to enter the dialing signal. In yet another embodiment of the present invention, the dialing signal comprises the "#" sign.

The caller follows the dialing signal with a telephone number or address as previously discussed. In an alternate embodiment, the TCG identifies what long distance call is desired by the initial dialing to the TCG. The TCG routes the call over a voice and data network, such as the Internet, to the desired long distance phone. Thus, using the present invention, placing a call the TCG from long distance does not cost any more than a local call.

FIG. 7 illustrates a block diagram of a PSTN having means for sending a call over a VDN at the direction of a caller in accordance with an embodiment of the present invention. A PSTN 715 comprises a switch 720 and a TCG 730. The PSTN 715 receives mobile calls from mobile telephone 700 via mobile communication network 705. The PSTN 715 also receives calls from telephone 710. Calls received by the PSTN are processed by TCG 730 and their destination determined as previously discussed. Calls destined for first communication device 725 are passed to switch 720 and the calling party is connected to first communication device 725 via the PSTN 715. Calls destined for second communication device 740 are passed to VDN 735 and ultimately to second communication device 740.

By way of illustration and not as a limitation, telephone 710 places a call to another telephone on the PSTN 715. (In this illustration, first communication device 725 is such a telephone.) The call is evaluated by TCG 730 and routed through switch 720. Similarly, a call placed by mobile telephone 700 to first communication device 725 would be routed over the PSTN 715 and through switch 720. By contrast, a caller may designate that the call be transported via VDN 735 to second communication device 740. Second communication device 740 may be any device or combination of devices that may be connected to, and receive communications from, VDN 735, including a telephone. (See FIG. 4.) In this embodiment of the present invention, TCG 730 determines whether a VDN designator is present in the dialed number and, if so, routes the call to the VDN for ultimate delivery to second communication device 740.

The present invention uses a TCG in its various embodiments. The TCG itself may implement multiple digital networking protocols using a telephony protocol engine (TPE). One such protocol that may also be used is the Session Initiation Protocol, or SIP. SIP is an IETF signaling protocol for establishing real-time calls and conferences over Internet Protocol networks. In this embodiment, the TPE is implemented using inexpensive, memory limited microprocessors and inexpensive flash memory. However, this is not meant as a limitation. As will be apparent to those skilled in the art, the present invention may be implemented in other computing contexts without departing from the scope of the present invention.

What is claimed is:

1. A method for routing a telephone call over a voice and data network (VDN), the method comprising:
   receiving a call from a remote communication device at a telecommunications gateway (TCG), wherein the call is directed to a called telephone number associated with the TCG and with a telephone physically coupled to the TCG;
   determining whether the call is to be redirected as a voice and data network (VDN) call, wherein the determination is made based on whether a caller is authorized to use the VDN;
   when the caller is authorized to use the VDN, redirecting the call as the VDN call by converting the call at the TCG into a format compatible with the VDN and connecting the converted call to a destination device via the VDN; and
   when the caller is not authorized to use the VDN, allowing the call to proceed by connecting the call to the telephone physically coupled to the TCG.

2. The method for routing a telephone call over a voice and data network of claim 1, wherein the call is received from a plain old telephone.

3. The method for routing a telephone call over a voice and data network of claim 1, wherein the call is received from a mobile device.

4. The method for routing a telephone call over a voice and data network of claim 3, wherein the mobile device comprises at least one of a wireless telephone, a wireless personal data assistant, and a computer having a wireless network interface card.

5. The method for routing a telephone call over a voice and data network of claim 3, wherein the call from the mobile device is routed via a public switched telephone network prior to routing the call to the TCG.

6. The method for routing a telephone call over a voice and data network of claim 1, wherein the voice and data network is the Internet.

7. The method for routing a telephone call over a voice and data network of claim 1, further comprising receiving a VDN designator via the call, wherein determining whether the call is to be redirected as the VDN call comprises determining whether the VDN designator is received.

8. The method for routing a telephone call over a voice and data network of claim 7, wherein the VDN designator comprises information indicating selection of one or more keys at a telephone keypad.

9. The method for routing a telephone call over a voice and data network of claim 8, further comprising:
    prompting the remote communication device for the VDN designator; and
    determining that the call is the VDN call when the VDN designator is received.

10. The method for routing a telephone call over a voice and data network of claim 9, wherein the VDN designator comprises information indicating selection of one or more keys at a telephone keypad.

11. The method for routing a telephone call over a voice and data network of claim 1, further comprising capturing caller ID data associated with the call to determine whether the call is authorized to be redirected as the VDN call.

12. The method for routing a telephone call over a voice and data network of claim 1, further comprising determining the destination device before connecting the converted call to the destination device, wherein determining the destination device comprises sending a dialing signal to the remote communication device and receiving a calling code associated with the destination device from the remote communication device.

13. The method for routing a telephone call over a voice and data network of claim 1, wherein the call comprises a calling code for the destination device and wherein connecting the converted call to the destination device comprises using the calling code to address data packets to the destination device.

14. A device comprising:
    a processor; and
    memory accessible to the processor, the memory comprising:
        instructions executable by the processor to receive an incoming call directed to a telephone number associated with a location of the device;
        instructions executable by the processor to determine whether the incoming call is a call to a remote destination device;
        instructions executable by the processor to determine whether a caller is authorized to use a voice and data network (VDN);
        instructions executable by the processor to allow the incoming call to proceed by connecting the incoming call to a telephone physically connected to the device when the caller is not authorized to use the VDN; and
        instructions executable by the processor to convert the incoming call to a format compatible with the voice and data network (VDN) and to send the converted incoming call to the remote destination device via the VDN when the caller is authorized to use the VDN.

15. The device of claim 14, wherein the memory further comprises instructions executable by the processor to connect the incoming call to the telephone physically connected to the device when the incoming call is not authorized to be sent to the remote destination device.

16. The device of claim 14, wherein the memory further comprises instructions executable by the processor to receive a destination address of the remote destination device via the incoming call.

17. The device of claim 16, wherein, when no destination address is received, the incoming call is connected to the telephone physically connected to the device.

18. The device of claim 14, wherein sending the converted incoming call to the remote destination device comprises converting voice data received via the incoming call into a stream of data packets addressed to the remote destination device and sending the stream of data packets via the VDN to the remote destination device.

19. The device of claim 14, wherein the memory further comprises instructions executable by the processor to authenticate the caller based at least partially on caller ID information received via the incoming call.

20. The device of claim 14, wherein the memory further comprises instructions executable by the processor to authenticate the caller based at least partially on an electronic serial number of a calling device.

21. The device of claim 14, wherein the incoming call is received via a connection to a public switch telephone network and wherein the VDN comprises an Internet.

22. The device of claim 14, further comprising:
    a connector to connect to a public switched telephone network;
    a connector to connect to the telephone device; and
    a connector to connect to the voice and data network.

23. The device of claim 14, wherein the memory further comprises instructions executable by the processor to receive a signal indicating that the incoming call is not directed to the telephone.

* * * * *